United States Patent [19]

Maudal

[11] 4,136,844
[45] Jan. 30, 1979

[54] QUASI-INERTIAL ATTITUDE REFERENCE PLATFORM

[75] Inventor: Inge Maudal, Claremont, Calif.

[73] Assignee: General Dynamics Corporation, Pomona, Calif.

[21] Appl. No.: 667,240

[22] Filed: Mar. 15, 1976

[51] Int. Cl.² .................... F41G 9/00; F42B 15/02; F42B 15/00
[52] U.S. Cl. ................................. 244/3.2; 244/165
[58] Field of Search .............................. 244/3.2, 165

[56] References Cited

U.S. PATENT DOCUMENTS

| | | | |
|---|---|---|---|
| 3,263,944 | 8/1966 | Watson | 244/3.2 |
| 3,365,148 | 1/1968 | Preston et al. | 244/3.2 |
| 3,412,239 | 11/1968 | Seliger et al. | 244/3.2 |
| 3,491,228 | 1/1970 | Selvin | 244/3.2 |
| 3,746,281 | 7/1973 | Stripling | 244/3.2 |

Primary Examiner—Samuel W. Engle
Assistant Examiner—Thomas H. Webb
Attorney, Agent, or Firm—Henry M. Bissell; Edward B. Johnson

[57] ABSTRACT

An inertial guidance system including a true space stable platform is provided while retaining a simple two-degree-of-freedom gimbal system. An added third degree of freedom is provided by motions of the support itself which maintains desired platform orientation. The output of a third axis instrument is used to maneuver the frame itself about the axis of the frame which most nearly will null any rotation about the platform roll or longitudinal axis. A rotational rate gyroscope is positioned on the space stable platform, and actuates the movement of the frame about the longitudinal or roll axis directly from the reading of the rotational movement along the roll axis of the platform.

10 Claims, 2 Drawing Figures

QUASI-INERTIAL ATTITUDE REFERENCE PLATFORM

BACKGROUND OF THE INVENTION

1. Field of the Invention

The invention relates to inertial guidance systems and, more particularly, to such systems for missiles which are launched vertically.

2. Description of the Prior Art

It has long been known in aerospace guidance to use gyroscopic sensing instruments mounted on a space stable or space-fixed platform within a frame and mounted to the frame by a two-degree-of-freedom gimbaling arrangement to assist in controlling the pitch and the yaw of the frame as it is propelled or guided through air, space or water. Hereinafter in this discussion, the term "frame" will be used to mean any structure which can be guided or propelled through air, water or space. A frame conventionally refers to an air frame such as a missile and, in some instances, to an airplane or rocket. The frame may have, and hereinafter in this discussion will be considered to always have, three dimensions which may, for convenience, be considered as extending in X axis, Y axis and Z axis directions. Rotation of the frame about the Y axis shall hereinafter be considered to be the pitch of the frame. Rotation of the frame about the Z axis shall hereinafter be considered the yaw of the frame. Rotation of the frame about the X axis shall hereinafter be considered the roll of the frame.

The X axis of the frame in most applications will constitute a longitudinal axis of the frame, such as a missile, airplane or rocket.

The platform mounted by gimbals within the frame may also be considered to extend in three dimensions. Hereinafter in this specification, the dimensions of the platform shall be considered to extend along its own A axis, B axis and C axis. The A, B and C axes are mutually orthogonal to each other. The pitch of the platform hereinafter shall be considered rotation about the B axis of the platform. The yaw of the platform shall hereinafter be considered the rotation about the C axis. Rotation of the platform about its A axis shall be considered its roll.

The frame is free to move. Its motion may be described by angular rates $\omega_x$, $\omega_y$, and $\omega_z$ of the respective axes X, Y and Z. The motion of the platform in inertial space may be expressed by the rotation $\omega_a$, $\omega_b$ and $\omega_c$ about the A, B and C axes constituting the platform axes system. In order to maintain a true inertial reference and a true space stable inertial platform, it is necessary to control the three rotations $\omega_a$, $\omega_b$ and $\omega_c$.

It is known to use a two-gimbal system for mounting guidance platforms within missiles. In such a two-gimbal system, rotations about only two of the axes may be controlled. It is not possible to directly control the third axis rotation.

Consider, for example, a conventional two-gimbal system. Motion is only attainable through the gimbal axes which may not correspond to the orthogonal axes A, B and C of the platform system. Thus, the relationship of the outer gimbal relative to the frame may be described by the angle $\alpha$, and that of the inner gimbal relative to the frame outer gimbal by the angle $\beta$. The angles $\alpha$ and $\beta$ are uniquely defined by the following matrix relationship between the platform and missile axis systems:

$$\begin{pmatrix} A \\ B \\ C \end{pmatrix} = \begin{bmatrix} \cos\alpha\cos\beta & \sin\alpha\cos\beta & -\sin\beta \\ -\sin\alpha & \cos\alpha & 0 \\ \cos\alpha\sin\beta & \sin\alpha\sin\beta & \cos\beta \end{bmatrix} \begin{pmatrix} X \\ Y \\ Z \end{pmatrix} \quad (1)$$

where A, B and C are components of a vector in the X, Y and Z axes system expressed in the A, B and C axes system. The angles $\alpha$ and $\beta$ are achieved by controlling the gimbal rates denoted $\dot{\alpha}$ and $\dot{\beta}$.

The rotational motion of the platform in inertial space can now be expressed in terms of the rotation of the missile $\omega_x$, $\omega_y$ and $\omega_z$ and of the gimbal rotation $\dot{\alpha}$ and $\dot{\beta}$:

$$\begin{array}{llll} \omega_a = (\cos\alpha\cos\beta) & \omega_x + (\sin\alpha\cos\beta) & \omega_y - \sin\beta(\omega_z + \dot{\alpha}) & (2) \\ \omega_b = (-\sin\alpha) & \omega_x + (\cos\alpha) & \omega_y + \dot{\beta} & \\ \omega_c = (\cos\alpha\sin\beta) & \omega_x + (\sin\alpha\sin\beta) & \omega_y + \cos\beta(\omega_z + \dot{\alpha}) & \end{array}$$

The rotation rates $\omega_x$, $\omega_y$ and $\omega_z$ are disturbances to the platform. The gimbal rotation rates $\dot{\alpha}$ and $\dot{\beta}$ are available forcing inputs which may be used to stabilize the platform. In a conventional two-gimbal system, the gimbal rates $\dot{\alpha}$ and $\dot{\beta}$ are used to maintain respectively $\omega_c$ and $\omega_b$ at zero. Maintaining such rotations at zero will maintain the A axis in a fixed direction in space. The rotation $\omega_a$, however, about the A axis cannot be controlled since $\dot{\alpha}$ is already allocated as a driving function to control $\omega_c$. Thus, the platform may unintentionally rotate or roll about its A axis and will not be a true inertial reference.

Attempts have been made to overcome this problem in guidance systems for missiles. In this regard, attention is directed to Stripling, U.S. Pat. No. 3,746,281. Stripling, representative of conventional, two-axes space-fixed platforms with pitch and yaw gimbals, suggests strapped-down, single-degree-of-freedom gyroscopically actuated roll control. Hereinafter in this specification, description of an element as being "strapped down" shall be used to mean that the element is fixed to the frame directly. Such strapped-down, single-degree-of-freedom, gyroscopically-actuated roll control, however, inherently defines a hybrid, and the platform used for guiding the frame is not a true inertial platform. It has long been sought to attain a true inertial platform for the guidance of frames, such as missiles, airplanes and rockets.

SUMMARY OF THE INVENTION

A true inertial, space-stable platform system is provided by embodiments of the present invention. The true inertial platform is considered as having a separate axis system from that of the frame wherein the platform is gimbaled. The plane of the platform is maintained inertially by control of the gimbal rates of a conventional two-gimbal system. Control of movement about the third orthogonal, frequently longitudinal platform axis is contemplated by the sensing of such movement by a rate gyroscope mounted on the platform structure. Signals from the third, platform-mounted gyro are used to control rotation about the missile roll axis, such that the angular rotation about the platform axis is maintained or brought to zero, thus achieving a true inertial platform.

BRIEF DESCRIPTION OF THE DRAWING

A better understanding of the present invention may be had from a consideration of the following detailed description, taken in conjunction with the accompanying drawings, in which.

DESCRIPTION OF THE PREFERRED EMBODIMENT

Figure 1:
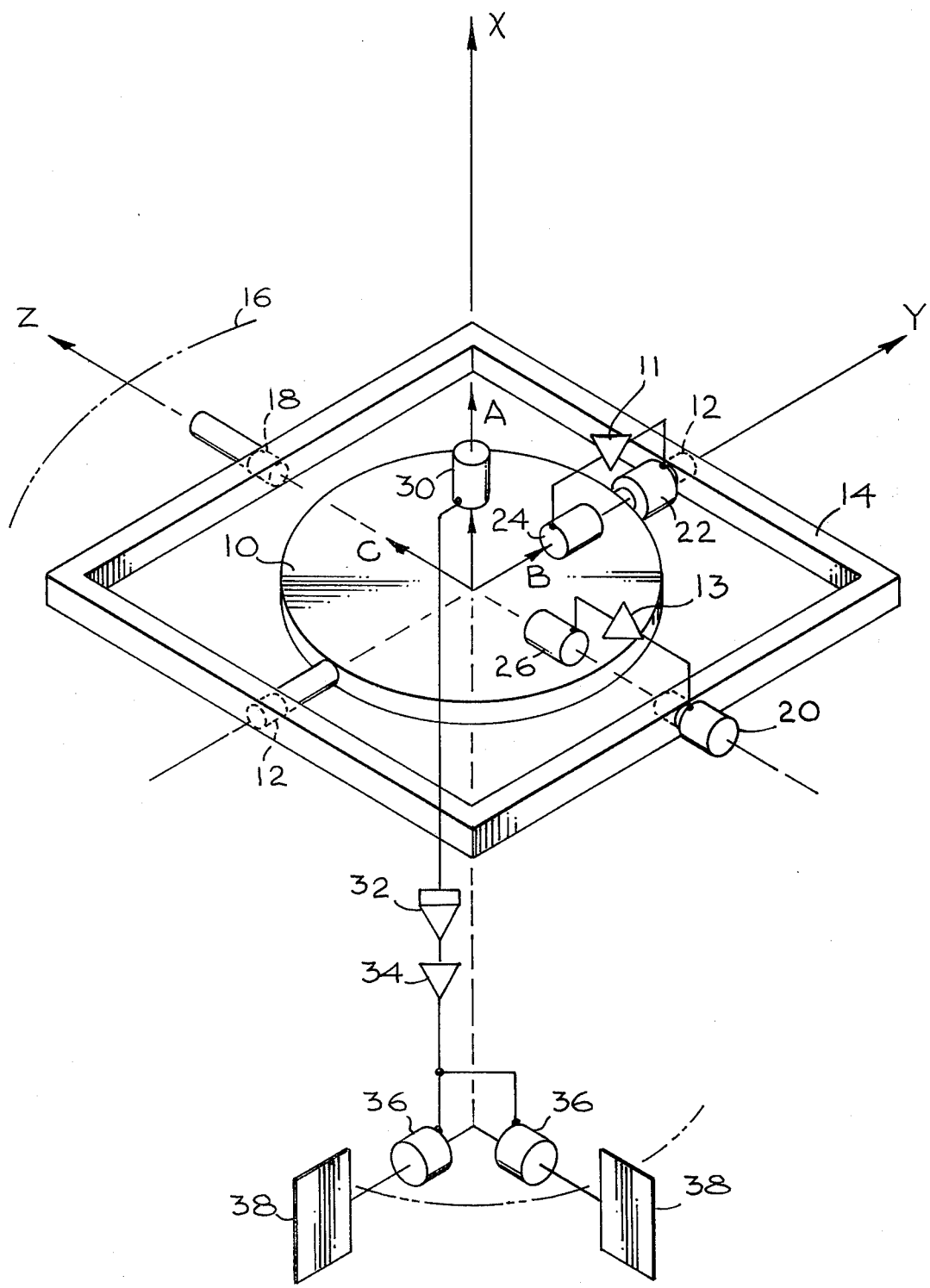
FIG. 1 illustrates a partially exploded, perspective view of the preferred embodiment of the invention.

In order to achieve the desired space-stable, true inertial platform a guidance platform 10 is shown, reference being had initially to FIG. 1 of the drawings. The platform 10 is mounted within the frame of, say, a missile whose longitudinal axis is X, whose pitch axis is Y and whose yaw axis is Z. The platform 10 itself has axes A, B anc C as shown in FIG. 1. A true inertial, space-stable platform may be desired, for example, for mounting a missile seeker antenna. The platform 10 constitutes the inner gimbal and is supported by bearings 12 to outer gimbal 14. Outer gimbal 14 is supported to the frame 16 on bearings 18. These bearings 12, 18 constitute the only points of attachment of the platform 10 with the frame. Torque motor 20 when actuated applies torque to the outer gimbal. Torque motor 22 when actuated similarly applies torque to the inner gimbal or platform 10.

As in conventional two-degree-of-freedom gimbaled guidance platforms, a pitch-sensing gyroscope 24 is mounted on the platform 10 and senses any pitch acceleration or movement of the platform about the B axis. Similarly, a rotation-sensing gyroscope 26 mounted on the platform 10 senses acceleration or rotation of the platform about the C axis. Rotation of the platorm 10 about the B axis is sensed by gyroscope 24 which delivers an electrical signal to associated circuitry 11. A corresponding output signal from circuitry 11 actuates torque motor 22 which operates through a seeker inertia stage 23 (FIG. 2) to rotate the inner gimbal or platform 10 about the B axis so as to maintain the movement of the platform at a zero angle in space. similarly, rotation of the platform 10 about the C axis is sensed by the gyroscope 26. The gyroscope 26, upon any angular acceleration or rotation by the platform 10 about the C axis, delivers an electrical signal to electronic circuitry 13. Circuitry 13 delivers an electronic actuating signal to torque motor 20, which operates through a seeker inertia stage 21 (FIG. 2) to move the outer gimbal 14 so as to maintain the movement of gimbal 14 at a zero angle relative to the original position of gimbal 14 in space.

In contradistinction to conventional space-stable platforms, a third gyroscope 30 is mounted on the platform 10. The third gryoscope 30 senses rotational acceleration or movement of the platform 10 about the A axis. It sould be noted that the A axis originally in the frame is coincidental with the X axis of the frame. Any angular acceleration or rotational movement of the platform 10 about the A axis is sensed by gyroscope 30 which delivers an electronic signal to integrator 32. The signal indicating angular rotation or rotational movement of the platform 10 about the A axis is integrated, and then processed by electronic circuitry 34. Electronic circuitry 34 is capable of sending electronic signals to servoactuators 36 which deflect aerodynamic control surfaces 38 in a predetermined direction to result in an aerodynamic torque applied about the missile's roll axis X. The aerodynamic surfaces 38 are mounted to the exterior of the frame 16 so that in the forward motion along the X axis, deflecton of the exterior surfaces 38 will affect the roll of the frame 16 about its X axis. The processed signal from the electronic circuitry 34 is designed to maintain the signal from the gyroscope 30 at zero, or at null voltage signal.

In operation rotations $\omega_y$ and $\omega_z$, the pitch and yaw respectively of the frame, determine the missile flight trajectory. The rotation $\omega_x$ or roll motion of the frame is relatively unimportant to the trajectory. Provided that the missile roll relative to the inertial guidance platform is known, the roll motion of the frame itself does not affect the desired trajectory. Therefore we may utilize the missile roll in a preferred maneuver other than in support of the missile flight, such that the platform remains inertially stationary.

Figure 2:
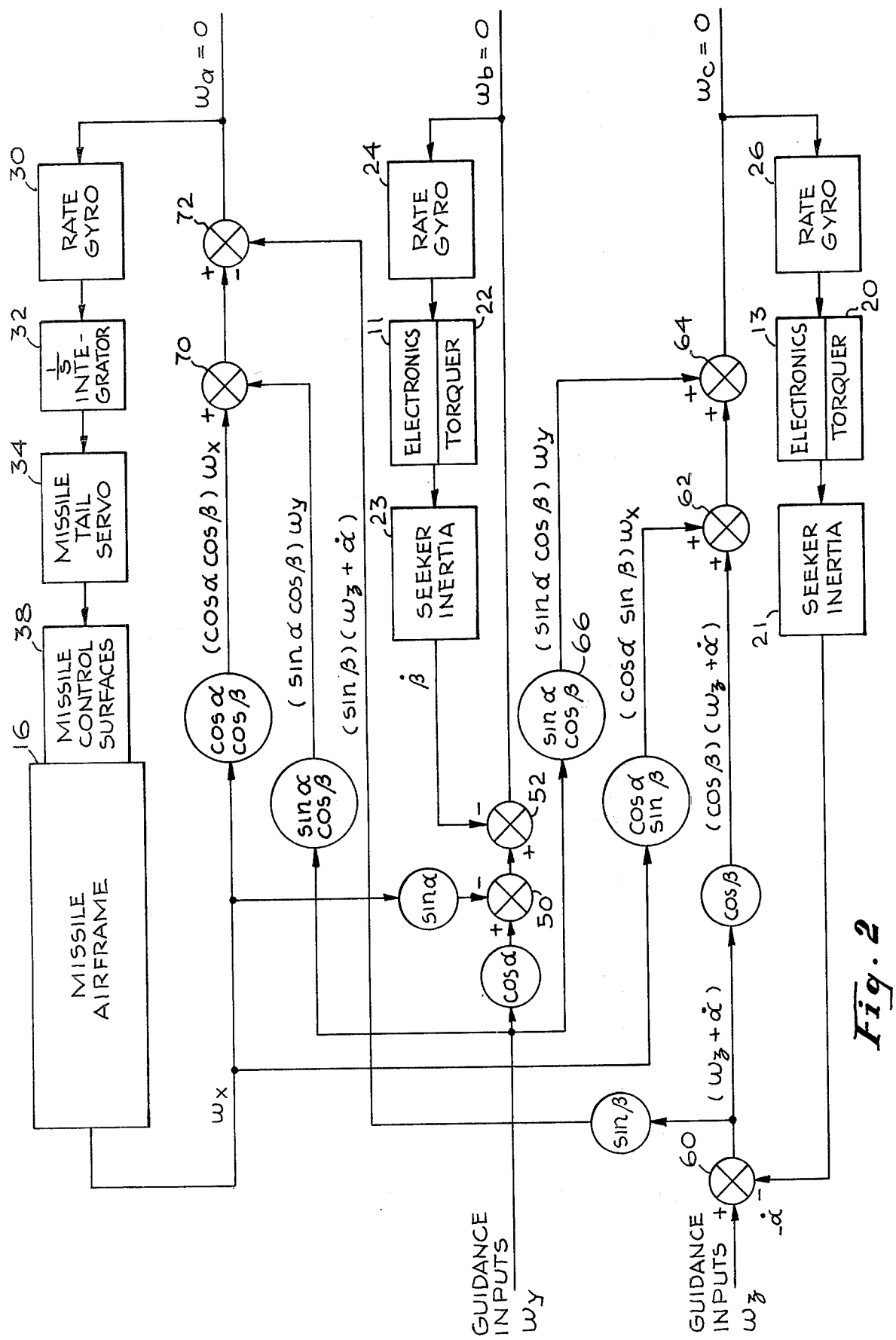
FIG. 2 is a schematic block diagram illustrating the operation of the preferred embodiment of the invention.

The operation of the inertial platform may be further explained via the block diagram of FIG. 2. The diagram respresents the solution of Equations (2) as given above. The trigonometric functions within the circles denote products which yield the component of a vector in one axes-system resolved into a second axes-system. This transformation is well known to those skilled in the art. For example, the product $(\sin\alpha\cos\beta)\omega_y$ shown after circle 66 denotes the component of the airframe rotational rate $\omega_y$ which appears along the C-axis of the inertial platform. The components from the other inputs, $\omega_x$ and $\omega_z$, similarly contribute to rotations about the C-axis. The total rotation about the C-axis consists of the sum of the components. The summation is represented in FIG. 2 by summing junctions 62 and 64. The rotation is measured by rate gryo 26 and the resultant signal is converted via electronics 13 and torquer 20 to effect a rate $\dot{\alpha}$ about the outer gimbal axis. The gimbal rate is commanded in such a way as to maintain the rate $\omega_c$ at zero. This form of closed loop control is well-known to those skilled in the art, and may be better understood when read in conjunction with standard literature in the art. See, for example, "Rotations and Their Algebra", by Arthur Mayer, *SIAM Review*, Volume 2, Number 2, April, 1960.

Similar solutions in $\omega_a$ and $\omega_b$ are indicated in FIG. 2.

It can thus be seen that by using the gyroscope output to generate forcing inputs to the appropriate gimbal and to the missile roll axis, such that movements about the three orthogonal axes of the platform are maintained at zero, a true inertial reference platform can be obtained.

Although there have been described above specific arrangements of a quasi-inertial attitude reference platform in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the appended claims.

What is claimed is:

1. A space-stable reference platform system comprising:
    a frame rotatable about at least one axis;
    a platform having three orthogonal axes;
    sensing means for sensing rotational movement of the platform about all of said orthogonal axes, said sensing means being positioned on said platform;
    inner and outer gimbals for mounting the platform for movement relative to the frame such that the platform is capable of two-degrees-of-freedom axial rotation about first and second orthogonal axes, the outer gimbal being pivotably mounted on the frame, the inner gimbal including the platform being pivotably mounted to the outer gimbal;

first means responsive to said sensing means for rotating said gimbals relative to the frame in order to maintain the platform aligned in space with respect to said first and second axes; and second means responsive to said sensing means for rotating said frame in order to maintain the platform aligned in space with respect to the third orthogonal axis.

2. The system of claim 1 wherein the sensing means comprises three gyroscopes orthogonally mounted on the platform.

3. The system of claim 1 wherein the second means responsive to the sensing means includes electrical circuitry responsive to voltage potential signals proportional to angular rates of said three axes generated by said sensing means.

4. The system of claim 3 wherein the electrical circuitry includes an integrator for integrating the signal from the sensing means to provide an indication of angular deviation of the platform relative to said third axis.

5. The system of claim 1 wherein the second means is operable to rotate the frame about a longitudinal axis, wherein the outer gimbal is so mounted as to be pivotable about a pivot axis orthogonal to the longitudinal axis of the frame, an wherein the inner gimbal is so mounted as to be pivotable about an axis orthogonal to both the longitudinal axis of the frame and the pivot axis of the outer gimbal.

6. A space-stable reference platform system for controlling the movement of a platform movably positioned within a rotatable frame capable of forced movement through space, comprising:

a frame having a longitudinal axis about which said frame is capable of rolling;

a platform mounted within said frame, said platform having three orthogonal axes;

a plurality of gimbals aligned respectively in only two of said axes for mounting said platform to said frame whereby said platform is capable of two-degrees-of-freedom rotation about two gimbal axes;

sensing means positioned on said platform for sensing rotational movement about all of said orthogonal axes;

first means responsive to said sensing means for rotating said gimbals to compensate for said rotational movement about said two platform axes; and second means responsive to said sensing means for rotating said frame to compensate for rotational movement of the platform about said third axis.

7. The system of claim 5 wherein the sensing means includes a gyroscope aligned to sense rotation of the platform relative to the longitudinal axis of the frame and coupled to provide a corresponding signal to said second means.

8. The system of claim 3 wherein the electrical circuitry comprises means for performing functions indicated in the following equations:

$$\omega_a = (\cos\alpha\cos\beta) \omega_x + (\sin\alpha\cos\beta) \omega_y - \sin\beta (\omega_z + \dot{\alpha})$$

$$\omega_b = (-\sin\alpha) \omega_x + (\cos\alpha) \omega_y + \dot{\beta}$$

$$\omega_c = (\cos\alpha\sin\beta) \omega_x + (\sin\alpha\cos\beta) \omega_y + \cos\beta (\omega_z + \dot{\alpha})$$

wherein $\omega_x$, $\omega_y$ and $\omega_z$ are respectively rotation rates of the frame; $\omega_a$, $\omega_b$ and $\omega_c$ are respectively rotation rates of the platform; $\alpha$ is the angle of the outer gimbal relative to the frame; $\beta$ is the angle of the inner gimbal relative to the outer gimbal; $\dot{\alpha}$ and $\dot{\beta}$ are gimbal rates of the outer and inner gimbals respectively; and further including means for forcing each of the values $\omega_a$, $\omega_b$ and $\omega_c$ to equal zero.

9. The system of claim 8 wherein the means for forcing $\omega_a$ to equal zero comprises control means for varying $\omega_x$.

10. The system of claim 9 wherein the control means further comprises a roll control mechanism attached to the frame.

* * * * *